March 10, 1936.  J. P. GIBBS  2,033,701

FISHING DEVICE

Original Filed May 27, 1929

Inventor
Jacob P. Gibbs,
BY
ATTORNEY

Patented Mar. 10, 1936

2,033,701

UNITED STATES PATENT OFFICE 2,033,701

FISHING DEVICE

Jacob P. Gibbs, Oklahoma City, Okla., assignor of one-half to Loyal J. Miller, Oklahoma City, Okla.

Refiled for abandoned application Serial No. 366,389, May 27, 1929. This application November 12, 1932, Serial No. 642,439

19 Claims. (Cl. 43—28)

My invention relates to a fishing device as an article of manufacture and is refiled for abandoned application Serial No. 366,389, filed May 27, 1929.

The objects of my invention are to provide a device of this class which is new, practical, novel and of utility; which will be readily attachable to a fishing line; which will permit live minnows suspended on hooks thereupon a great freedom of movement; which will permit said minnows to freely swim around the fishing line without twisting the same; which may be used singly or in combination, suspended from a float; which may be used singly or in combination on a tight line; which may be used in combination of a trot line or a throw line; which may be used with either live or still bait; which will not be easily tangled; and, which will be efficient in accomplishing all the purposes for which it is intended.

In so far as this inventor is informed or can ascertain there are no devices in use at the present time designed to give live bait on a plurality of hooks on a fish line freedom of action without twisting or tangling the line.

The usual method of attaching leaders bearing hooks to a main line is to tie the leader directly on the line at intervals far enough apart to prevent one hook from reaching the other. This is true in practically all kinds of line fishing where it is desired to use more than one hook upon a main line. The leaders are usually eight to twelve inches long and are tied rigidly to the main line. It may be readily understood that when a live minnow is used upon the hook as bait that in swimming around it is quite likely to and often does swim around and around the main line. This of course wraps the leader upon the main line and will finally prevent the minnow from swimming at all as all of the leader will be wound around the line. The purpose of using live bait in fishing is to allow the bait to move with sufficient freedom as to attract the attention of the fish being sought, and when the movement of the minnow is curtailed the likelihood of catching the fish is lessened. It is known to those familiar with the art that a fish is less likely to bite a bait either alive or dead, moving or stationary, which is seen to be fastened directly upon a visible line. For this reason the practice of using gut leaders has become general. It will therefore be understood that when any bait either alive or dead is brought to a position close to the main line the chances of a fish biting it are greatly lessened.

Another difficulty encountered when attaching leaders rigidly to the main line when fishing with a cork is the tangling of the bait with the main line above the cork. When the line is cast into the water, it is usually thrown out past the end of the fishing pole, or rod, and the line between the cork and the end of the pole is usually fairly taut, but in still water the cork often drifts back toward the end of the pole. This allows the line between the cork and the pole to slacken and hang in a loop below the cork. When the minnow swims around the main line below the cork, if the leader is rigidly tied to the main line, it will cause the cork to rotate in the water. This will cause the line below the cork to twist up with the loop made by the line above the cork and in a short time the line and leaders are usually badly tangled. This also impairs the action of the cork to indicate when a fish is biting. It also causes an uneven force to be exerted upon the lower part of the main line when the pole is raised to withdraw a hooked fish from the water. This often results in losing the fish.

My device prevents all of the tangling of the line as above described when fishing with a cork by allowing the free movement of the leaders without twisting or binding with the main line and at the same time allows the live bait to swim freely about to attract the attention of the fish.

A trot-line is composed of a main line usually stretched across a stream and is always anchored at each end and has a number of leaders attached at intervals along its length, each bearing a hook. The main line is usually made of heavy twisted cord and is drawn taut usually just below the surface of the water. It may be understood that when the main line is drawn taut there is a rotating motion actuated and that if the leaders are rigidly tied thereto they will be wound upon the main line as the main line is being tightened. This, of course, shortens the sweep of the leaders.

My invention prevents the leaders from being wound upon the main line because the line is allowed to rotate within the end of the leader attached thereto.

With these and other objects in view as will more fully appear my invention consists in the construction, novel features, and combination of parts hereinafter more fully described, pointed out in the claims hereto appended, and illustrated in the accompanying one sheet drawing, of which, Figure 1 is a fragmentary perspective view showing the ball portion of my device with a swivel and snap therefrom suspended and showing the periphery of its swing dotted in;

Like characters of reference designate like parts in all the figures.

Figure 1:
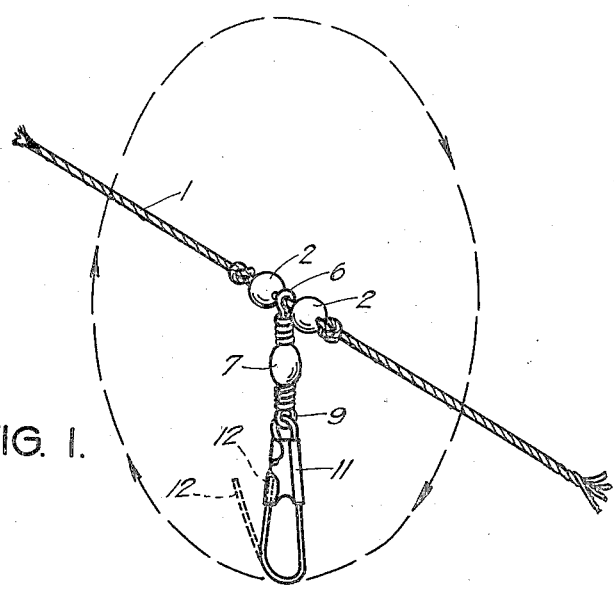

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

Figure 3:
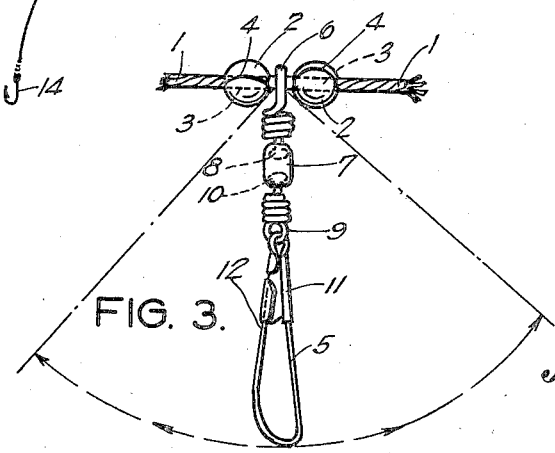
Fig. 3 is an elevational view.
Figure 5:
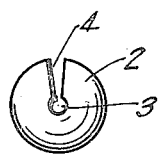
Figure 5 is a perspective view of one form of the ball or button to be used as best shown in Fig. 3.

A practical embodiment of the invention as illustrated in the drawing includes:

A main line 1 of any suitable material such as silk, cotton and the like, having a plurality of pairs of buttons or balls or beads 2 attached at spaced intervals thereon. Said beads 2 may be made of any suitable material such as glass, metal, and the like, and may be attached upon said main line 1 by any usual or known means. One method of attaching said beads 2 is shown in Fig. 1. In this instance the beads 2 are centrally perforated and the main line passes through the perforation and is knotted on each side of the pair of beads. As best shown in Fig. 5, one of said beads 2 is shown as having a central perforation 3 and a slot 4 cut from the periphery of said bead 2 to said perforation 3. The bead when formed in this manner is preferably to be made of lead or some pliable metal and is placed upon said line 1 by passing said slot 4 over said line 1 until it is within said perforation 3, and then compressing said bead 2 until said slot 4 is closed. This method of attachment is best seen in Fig. 3.

Between each pair of said beads 2 is provided a double swivel safety hook 5, which has an upper loop 6 for receiving said line 1 and is swivelly connected in member 7 by ball 8. Said hook 5 is further provided with loop 9 which is also swivelly connected to said member 7 by ball 10. Said hook 5 is further provided with safety guard 11 into which its free end 12 may be snapped or unsnapped as shown in dotted lines in Fig. 1.

Figure 4:
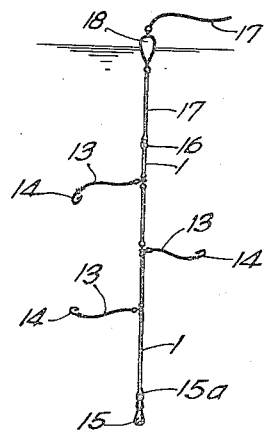
Fig. 4 is an elevational view of my device as used with a float.
Figure 2:
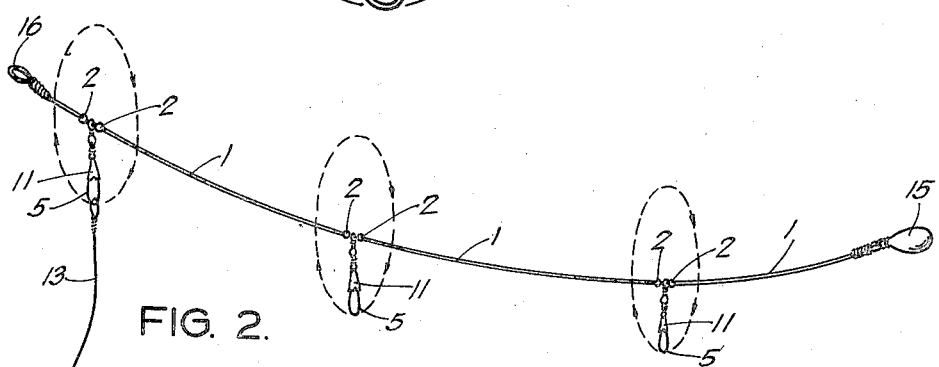
Fig. 2 is a perspective view showing my device assembled with swivel, snap and gut leadered hook.

For the purpose of fishing with the use of a cork I provide an assembled unit as shown in Fig. 4 having a weight 15 attached at its lower end through a loop 15a, and a plurality of pairs of said beads 2 each pair positioning a swivel hook 5 as above described spacedly positioned upon its central portion and a loop 16 at its upper end for quickly attaching a line shown as 17 leading through a cork 18 from a pole not shown.

For assembling a trot-line, the same form of assembled unit is provided as for use with a fork, except one of the said safety hooks 5 is positioned in said loop 15a instead of a weight. This enables the fisherman to assemble as many of the units as is desired.

It may be seen that in each instance the beads forming each pair, are spaced apart from each other a sufficient distance to allow the swivel to be drawn into a position parallel to the axis of the main line. This permits each leader to act as the end of the line when a fish is hooked, and eliminates any chance of the fish bending or breaking the swivel, which might be done if the beads were placed closely together.

Obviously the invention is susceptible of embodiment in forms other than that which is illustrated in the accompanying drawing and described herein, and applicable for uses and purposes other than as detailed, and I therefore consider as my own all such modifications and adaptations and other uses of the form of the device other than as herein described as fairly fall within the scope of my invention.

Having thus described my invention, what is claimed and desired to be secured by Letters Patent, is:

1. A device, as described, embodying a double swivel and a safety hook having one end of said swivel revolubly mounted directly upon a fish line between a pair of separate spherical bead members mounted rigidly upon said line intermediate its ends for limiting the longitudinal movement of said swivel with reference to said line, said members being spaced apart sufficiently to permit the mounted end of said swivel to be revolubly held therebetween parallel to the axis of the line, as and for the purposes specified.

2. A device, as described, embodying a double swivel and a safety hook having one end of said swivel revolubly mounted upon a fish line between a pair of spacedly positioned spherical bead members rigidly mounted directly upon said line intermediate its ends, the spherical bead members being spaced apart sufficiently to permit the mounted end of said swivel to be revolubly held therebetween parallel to the axis of the line, the other end of said safety hook being adapted for fastening a fish hook or leader thereto.

3. A device, as described, embodying a double swivel and a safety hook having one end of said swivel revolubly mounted directly upon a fish line, a pair of members spherical bead rigidly positioned upon said line intermediate its ends for limiting the longitudinal movement of said swivel with reference to said line, said members being spaced apart sufficiently to permit the mounted end of said swivel to be revolubly held therebetween parallel to the axis of the line, the other end of said safety hook being adapted for fastening a fish hook or leader thereto.

4. A device, as described, embodying a fish line, and a double swivel and a safety hook, said swivel having one end revolubly mounted directly on said fish line between a pair of spherical bead members, said members being disposed upon said line intermediate its ends for limiting the longitudinal movement of said swivel and permitting the revoluble movement of said mounted end of the swivel, said members being spaced apart sufficiently to permit the mounted end of said swivel to be revolubly held therebetween parallel to the axis of the line, the free end of said safety hook being adapted for mounting a leader or fish hook.

5. The combination with a fish line having a weight adjacent its lower end and a cork disposed on said line thereabove and having a double swivel and a safety hook revolubly mounted at one end on said line intermediate said weight and said cork and having a fish hook connected to the free end of said safety hook by a leader, of a pair of spherical bead members spacedly positioned directly on said line one on each side of the mounted end of said swivel for limiting its longitudinal movement and permitting it to be revolubly held parallel to the axis of said line.

6. The combination with a fish line having a weight on its lower end and a cork disposed on said line thereabove and having a plurality of double swivels and safety hooks, each swivel having one end revolubly mounted on said line intermediate the weight and said cork, each safety hook having a fish hook connected thereto on its other end, of a plurality of spaced pairs of separately spaced spherical bead members positioned directly upon and around said line one spherical bead member of each of said pairs being disposed on the outer side of the mounted end of one of said swivels for limiting the longitudinal movement thereof with reference to the line and being so spaced that the mounted end of said swivel will be revolubly held parallel to the axis of the line.

7. The combination with a fish line having a weight on its lower end being adapted for tight line fishing and having a double swivel and a safety hook with one end of said swivel revolubly mounted on said line above said weight and having a fish hook connected to the free end of said safety hook, of a pair of spherical bead members spacedly positioned directly on said line one on each side of the mounted end of said swivel for limiting its longitudinal movement and permitting it to be revolubly held parallel to the axis of said line.

8. A device, as described, embodying a fish line, and a double swivel and a safety hook, said swivel having one end revolubly mounted directly on said fish line between a pair of spherical bead members, said members being disposed upon said line intermediate its ends for limiting the longitudinal movement of said swivel and permitting the revoluble movement of said mounted end, said swivel adapted for connecting at its other end said safety hook, said members being spaced apart sufficiently to permit said mounted end to be revolubly held therebetween so that it will be at right angles to the axis of said line, the free end of said safety hook being adapted to connect a leader or fish hook.

9. A device as described, embodying a double swivel and a safety hook having one end of said swivel revolubly mounted directly on a fish line between a pair of separate spherical bead members, said members being mounted on said line intermediate its ends for limiting the longitudinal movement of said swivel with reference to said line, said members being spaced apart sufficiently to permit the mounted end of said swivel to be revolubly held parallel to the axis of said line, the free end of said safety hook being adapted to connect a leader or fish hook.

10. A device as described, embodying a fish line having a looped lower end for fastening a weight thereto, a double swivel and a safety hook having one end of said swivel revolubly mounted directly on said line above said looped end between a pair of separate spherical bead members, said members limiting the longitudinal movement of said swivel with reference to said line and being spaced apart sufficiently to permit the mounted end of said swivel to be revolubly held therebetween parallel to the axis of said line, the free end of said safety hook being adapted to connect a leader or fish hook.

11. A leader connection for fishing lines, embodying a looped upper end for connecting said fishing line, and a looped lower end for connecting a weight, a pair of spherical bead members spacedly positioned upon and around said leader connection intermediate its ends, a swivel revolubly mounted at one of its ends upon said leader and held against longitudinal movement on said leader connection by said spherical bead members, said members being spaced apart sufficiently to permit the swivel to be revolubly held therebetween parallel to the axis of said leader, and a safety hook attached at one end to the free end of said swivel for connecting a second leader or fish hook to the other end of said safety hook.

12. A leader connection for fish lines, having a looped upper end for connecting said fish line, and a looped lower end for connecting a weight, a pair of spherical members spacedly positioned around said leader connection intermediate its ends and held thereon against longitudinal movement, a swivel and a safety hook, said swivel being revolubly mounted at one end upon said leader connection between said members and held thereby against longitudinal movement upon said leader, one end of said safety hook being mounted on said swivel and the other end of safety hook being adapted for connecting a second leader or fish hook.

13. A device, as described, embodying a double swivel and safety hook having one end of said swivel revolubly mounted directly upon a fish line, a pair of longitudinally positioned spherical bead members directly upon and around said line intermediate its ends for limiting the longitudinal movement of the mounted end of said swivel, said members being spaced apart sufficiently to permit the mounted end of the swivel to be revolubly held therebetween and parallel to the axis of the line, the other end of said safety hook being adapted for fastening a fish hook or leader thereto.

14. A device, as described, embodying a pair of spherical bead members positioned directly upon and around a fish line intermediate its ends for limiting the longitudinal movement of a double swivelled safety hook having one end thereof mounted therebetween directly upon said line, said spherical bead members being spaced apart sufficiently to permit the said mounted end to be revolubly held therebetween parallel to the axis of the line, the free end of said safety hook being adapted for fastening a fish hook or leader thereto.

15. A device, as described, having in combination, a plurality of pairs of spaced separate spherical bead members spacedly and rigidly positioned upon and around a fish line intermediate its ends, each pair limiting the longitudinal movement of a double swivelled safety hook having one end revolubly mounted directly upon said line, the said members of each pair being spaced apart sufficiently to permit the said mounted end to be revolubly held therebetween parallel to the axis of said line, a plurality of fish hooks, and a like plurality of leaders, each leader connecting one of said fish hooks to the free end of one of said safety hooks.

16. A device, as described, having in combination, a double swivelled safety hook revolubly mounted at one end directly upon a fish line, a pair of rigidly positioned spherical bead members mounted rigidly and directly upon said line intermediate its ends for limiting the longitudinal movement of said mounted end with reference to said line, said members being spaced apart sufficiently to permit the mounted end to be revolubly held therebetween and parallel to the axis of said line, a fish hook, and a leader for connecting said fish hook to the free end of said safety hook, all as and for the purposes specified.

17. The combination with a fish line having a double swivelled safety hook revolubly mounted directly thereon at one end, and having a fish hook connected to the free end of said safety hook by a leader, of a pair of spaced spherical bead members positioned directly on said line intermediate its ends for limiting the longitudinal movement of the mounted end with reference to said line, said members being spaced apart sufficiently to permit the mounted end to be revolubly held therebetween and parallel to the axis of said line, all as and for the purposes specified.

18. The combination with a fish line having a plurality of double swivelled safety hooks, each revolubly mounted at one end directly thereon, each hook having a fish hook attached to its free end by a leader, of a plurality of spaced pairs of separate spaced spherical bead members positioned directly upon and around said line intermediate its ends, each pair limiting the longitudinal movement of the mounted end of one of them with reference to said line, and being so spaced that each mounted end will be revolubly held therebetween parallel to the axis of the line, all as and for the purposes specified.

19. A leader connection for fishing lines, embodying a pair of spherical bead members rigidly and spacedly positioned directly upon and around said leader connection intermediate its ends, a swivel revolubly mounted at one end upon said leader connection between and held against longitudinal movement by said spherical bead members, said members being spaced apart sufficiently to permit the mounted end of said swivel to be revolubly held therebetween parallel to the axis of said leader connection, and a safety hook attached to the free end of said swivel for connecting a leader and fish hook.

JACOB P. GIBBS.